US012639061B2

(12) United States Patent
Betancourt et al.

(10) Patent No.: US 12,639,061 B2
(45) Date of Patent: May 26, 2026

(54) SYSTEMS AND METHODS FOR PROVIDING CODE PACKAGES TO USER DEVICES TO ALLOW FOR CONTROL OF GRAPHICAL USER INTERFACES OF THE USER DEVICES

(71) Applicant: Capital One Services, LLC, McLean, VA (US)

(72) Inventors: Pedro Betancourt, McKinney, TX (US); Dinesh Sundaram, Plano, TX (US); David Gillam, The Colony, TX (US); Preetha Veeraraghavan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 222 days.

(21) Appl. No.: 18/469,207

(22) Filed: Sep. 18, 2023

(65) Prior Publication Data

US 2025/0094155 A1      Mar. 20, 2025

(51) Int. Cl.
*G06F 8/65* (2018.01)
*G06F 3/0482* (2013.01)
*G06F 8/38* (2018.01)

(52) U.S. Cl.
CPC .............. *G06F 8/65* (2013.01); *G06F 3/0482* (2013.01); *G06F 8/38* (2013.01)

(58) Field of Classification Search
CPC ............. G06F 8/65; G06F 3/0482; G06F 8/38
See application file for complete search history.

(56) References Cited

U.S. PATENT DOCUMENTS

| | | | | |
|---|---|---|---|---|
| 10,749,986 B2 * | 8/2020 | Pierce | .................. | H04L 67/565 |
| 10,872,375 B1 | 12/2020 | Denbo | | |
| 2016/0285966 A1 * | 9/2016 | Brech | ................ | G06F 11/3433 |
| 2018/0203995 A1 * | 7/2018 | Yuen | ........................ | G06F 21/51 |
| 2019/0129730 A1 * | 5/2019 | Chen | ........................ | H04L 67/53 |
| 2019/0377588 A1 * | 12/2019 | Gupta | .................. | G06F 3/0484 |

\* cited by examiner

*Primary Examiner* — Daxin Wu
(74) *Attorney, Agent, or Firm* — Harrity & Harrity, LLP

(57) ABSTRACT

A system may obtain, from a user device, user information associated with a user of the user device. The system may send, to another system, a request for entity information associated with the user information. The system may obtain, from the other system and based on sending the request, the entity information, and may send, to the user device, one or more portions of the entity information. The system may thereby obtain entity selection information, and may communicate, with the other system and based on the entity selection information, to obtain entity capability information. The system may identify, based on the entity capability information, one or more code packages, and may send, to the user device, the one or more code packages to allow the user device to control a graphical user interface (GUI) of the user device.

20 Claims, 7 Drawing Sheets

100

410  Obtain user information

420  Send a request for entity information

430  Receive the entity information

440  Send one or more portions of the entity information

450  Obtain entity selection information

460  Communicate to obtain entity capability information

470  Identify one or more code packages

480  Send the one or more code packages

400

SYSTEMS AND METHODS FOR PROVIDING CODE PACKAGES TO USER DEVICES TO ALLOW FOR CONTROL OF GRAPHICAL USER INTERFACES OF THE USER DEVICES

BACKGROUND

A graphical user interface (GUI), is a type of user interface that allows a user of a user device to interact with the user device through visual elements such as icons, buttons, windows, and menus, using an interaction device of the user device, such as a mouse or a touchscreen.

SUMMARY

Some implementations described herein relate to a system for providing code packages to user devices. The system may include one or more memories and one or more processors communicatively coupled to the one or more memories. The one or more processors may be configured to obtain, from a user device, user information associated with a user of the user device. The one or more processors may be configured to send, to another system, a request for entity information associated with the user information. The one or more processors may be configured to obtain, from the other system and based on sending the request, the entity information. The one or more processors may be configured to send, to the user device, one or more portions of the entity information. The one or more processors may be configured to obtain, from the user device and based on sending the one or more portions of the entity information, entity selection information. The one or more processors may be configured to communicate, with the other system and based on the entity selection information, to obtain entity capability information. The one or more processors may be configured to identify, based on the entity capability information, one or more code packages from a plurality of code packages stored in a data structure. The one or more processors may be configured to send, to the user device, the one or more code packages to allow the user device to control a graphical user interface (GUI) of the user device.

Some implementations described herein relate to a non-transitory computer-readable medium that stores a set of instructions. The set of instructions, when executed by one or more processors of a system for providing code packages to user devices, may cause the system for providing code packages to user devices to obtain, from another system, entity information. The set of instructions, when executed by one or more processors of the system for providing code packages to user devices, may cause the system for providing code packages to user devices to send, to a user device, one or more portions of the entity information. The set of instructions, when executed by one or more processors of the system for providing code packages to user devices, may cause the system for providing code packages to user devices to obtain, from the user device and based on sending the one or more portions of the entity information, entity selection information. The set of instructions, when executed by one or more processors of the system for providing code packages to user devices, may cause the system for providing code packages to user devices to communicate, with the other system and based on the entity selection information, to obtain entity capability information. The set of instructions, when executed by one or more processors of the system for providing code packages to user devices, may cause the system for providing code packages to user devices to send, to the user device and based on the entity capability information, one or more code packages to allow the user device to control a GUI of the user device.

Some implementations described herein relate to a method. The method may include obtaining, by a system for providing code packages to user devices, entity selection information. The method may include communicating, by the system, with another system, and based on the entity selection information, to obtain entity capability information. The method may include sending, by the system, to a user device, and based on the entity capability information, one or more code packages to allow the user device to control a GUI of the user device.

DETAILED DESCRIPTION

Figure 1A:
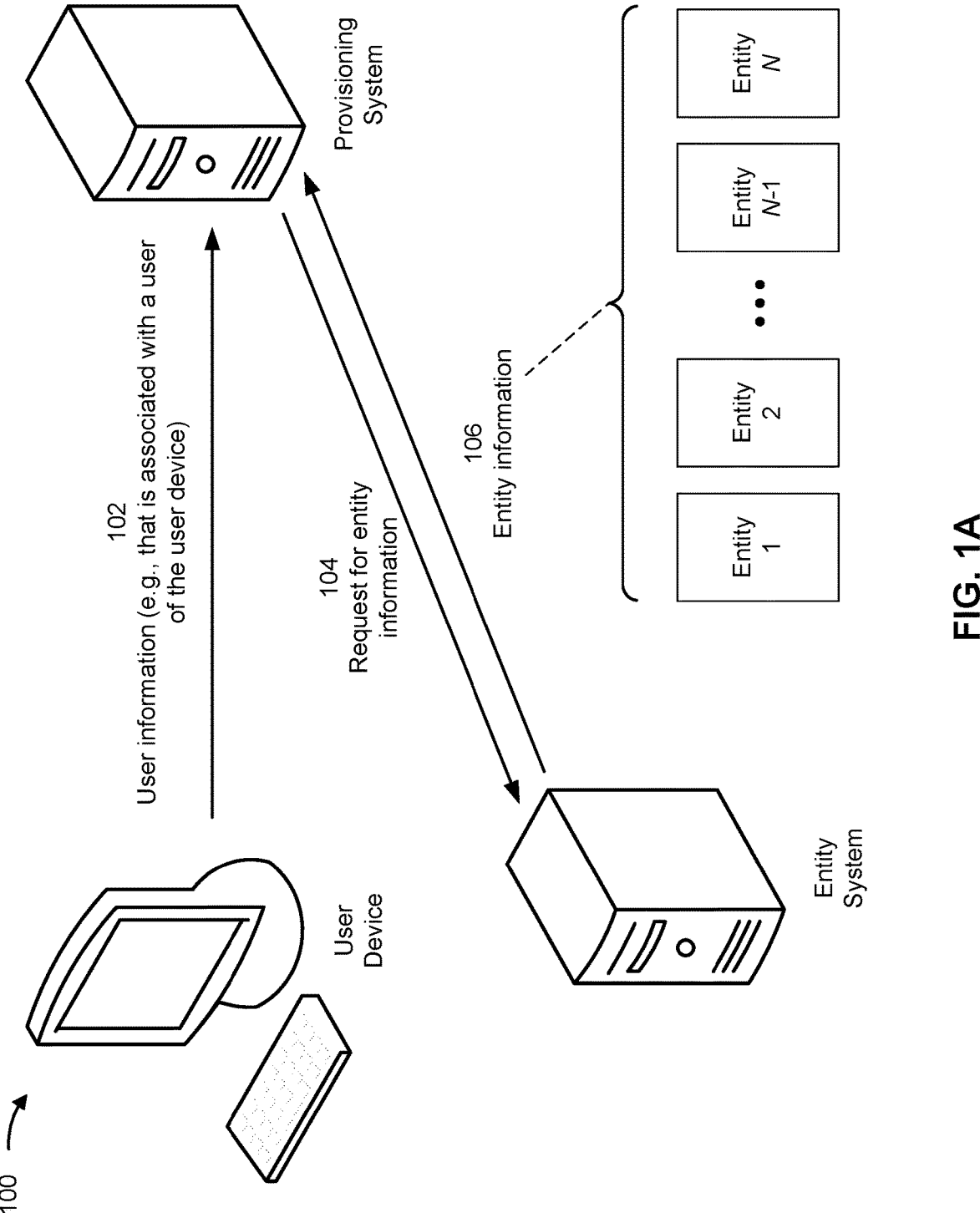
FIGS. 1A-1D are diagrams of an example associated with providing code packages, in accordance with some embodiments of the present disclosure.

The following detailed description of example implementations refers to the accompanying drawings. The same reference numbers in different drawings may identify the same or similar elements.

In many cases, a user of a user device interacts with a graphical user interface (GUI) of the user device to obtain information about an item. For example, the user may interact with an application of the user device that provides a GUI to view images or videos of an item. As another example, the user may use a web browser of the user device that provides a GUI, wherein the user may interact with a webpage rendered in the web browser to determine a pricing and/or availability of an item. This often requires a server (e.g., that provides the webpage) to interact with another system to obtain information identifying entities (e.g., organizations, such as providers, vendors, sellers, lenders, or other types of entities) that are able to provide the item. Accordingly, the server may generate, for each entity, code packages that, when implemented (e.g., by the user device, such in the web browser of the user device) allow information related to any potential capability of the entity (e.g., with respect to providing the item) to be shown via the GUI of the user device (e.g., in the web browser of the user device). Consequently, a particular code package that is associated with a non-supported capability of an entity, is still generated by the server, transmitted to the user device, and stored by the user device, even though the particular code package is not ever implemented by the user device (e.g., is not ever rendered in the web browser of the user device). This wastes computing resources (e.g., processing resources, memory resources, communication resources, and/or power resources, among other examples) of the server and the user device.

Some implementations described herein include a provisioning system for providing code packages to user devices, which allows for control of GUIs of the user devices. A user device sends user information (e.g., that is associated with a user of the user device) to the provisioning system, such as to allow the user to obtain an item (e.g., a product). The provisioning system thereby communicates with an entity system (e.g., that stores information about entities and interacts with respective systems of the entities) to obtain entity information, which indicates one or more entities that are able to provide the item (e.g., to the user of the user device). The provisioning system provides one or more portions of the entity information to the user device, which allows the user of the user device to select a particular entity of the one or more entities. The user device then sends, to the provisioning system, entity selection information that indicates the particular entity.

The provisioning system, based on the entity selection information, communicates with the entity system to obtain entity capability information, which indicates one or more capabilities associated with the particular entity. The entity capability information may indicate, for example, one or more item capability parameters associated with the particular entity, such as one or more item capability parameters that indicate different types, models, versions, features, and/or other characteristics of the item that are provided by the particular entity. Additionally, or alternatively, the entity capability information may indicate one or more technical capability parameters associated with the particular entity, such as a processing characteristic, a communication characteristic, and/or another characteristic associated with an ability of the particular entity to provide item information (e.g., described herein) associated with the item (e.g., in real-time, or near real-time).

Accordingly, the provisioning system identifies, based on the entity capability information, one or more code packages. Each code package is associated with a capability parameter of the particular entity, and is configured to present information (e.g., associated with the capability parameter) via a GUI of a device, such as a GUI of the user device. That is, each code package is configured to be implemented by a device, such as the user device, to cause particular information to be displayed via a GUI of the device. For example, a code package may be a web component, which may be configured to be implemented by the device, such as in a web browser of the device.

The provisioning system therefore sends the one or more code packages to the user device, which allows the user device to control a GUI of the user device (e.g., by the user device implementing the one or more code packages). For example, the user device may implement (e.g., run or execute) a code package, of the one or more code packages, to cause particular information (e.g., that is associated with the code package) to be displayed via a GUI of the user device. As a specific example, when the code package is a web component, the user device may implement the code package in the web browser of the user device, which causes particular information associated with the code package to be displayed via the web browser of the user device (e.g., as a web page, as an overlay on a webpage, or as a discrete portion of a webpage).

In this way, the provisioning system provides, to the user device, only code packages that are to be implemented by the user device (e.g., in a web browser of the user device, such as when the code packages are web components). Accordingly, the provisioning system minimizes a likelihood that a code package is generated by the provisioning system, sent to the user device, stored by the user device, and then not implemented by the user device. This thereby reduces wastage of computing resources (e.g., processing resources, memory resources, communication resources, and/or power resources, among other examples) of the provisioning system and the user device (e.g., that would otherwise be consumed). Further, because the provisioning system is identifying one or more code packages (e.g., that are already generated) based on capabilities associated with the particular entity, the provisioning system does not need to consume computing resources to newly generate code packages, or to generate or identify code packages that are not relevant to the capabilities associated with the particular entity. This therefore enables an improved performance (e.g., in terms of efficiency, latency, and/or other performance metrics) of the provisioning system and the user device in terms of identifying, providing, and implementing code packages that are relevant to the capabilities associated with the particular entity.

In a particular example, the user device sends user information (e.g., loan prequalification information) to the provisioning system, such as to allow the user to obtain a loan product. The provisioning system thereby communicates with the entity system to obtain entity information, which indicates one or more entities (e.g., one or more lenders) that are able to provide the loan product (e.g., to the user of the user device). The provisioning system provides one or more portions of the entity information to the user device, which allows the user of the user device to select a particular entity (e.g., a particular lender) of the one or more entities. The user device then sends, to the provisioning system, entity selection information that indicates the particular entity (e.g., the particular lender).

With respect to the particular example, the provisioning system, based on the entity selection information, communicates with the entity system to obtain entity capability information, which indicates one or more capabilities associated with the particular entity, such as different types of loan products, different loan amounts of loan products, different term durations of loan products, and/or other characteristics of loan products provided by the particular entity. Additionally, or alternatively, the entity capability information indicates how long the particular entity needs to generate loan product details and/or to communicate the loan product details to the provisioning system.

Accordingly, the provisioning system identifies, based on the entity capability information, one or more code packages that correspond to the one or more capabilities associated with the particular entity. For example, the provisioning system may identify a first code package associated with loan products with a term duration of X, and a second code package associated with loan products of type Y. The provisioning system therefore sends the one or more code packages to the user device, which allows the user device to control a GUI of the user device (e.g., by the user device implementing the one or more code packages). For example, the user device may implement the first code package to cause first particular information (e.g., that is associated with the first code package, such as information associate with a term duration of X) to be displayed via a GUI of the user device, and may implement the second code package to cause second particular information (e.g., that is associated with the second code package, such as information associated with a loan product type of Y) to be displayed via the GUI of the user device.

FIGS. 1A-1D are diagrams of an example 100 associated with providing code packages. As shown in FIGS. 1A-1D, example 100 includes a user device, a provisioning system, and an entity system. These devices are described in more detail in connection with FIGS. 2 and 3.

As shown in FIG. 1A, and by reference number 102, the provisioning system may obtain user information, such as from another device or from another system. The user information may be associated with a user of the user device. For example, the user information may include user identifier information (e.g., that indicates a name, or another identifier, of the user), user demographic information (e.g., that indicates a sex, an age, a race, and/or other demographic information of the user), user contact information (e.g., that indicates a phone number and/or an electronic messaging account, such as an email account or a social media account, of the user), user financial information (e.g., that indicates financial data, credit data, and/or other similar data of the user), and/or user location information (e.g., that indicates a residence, a place of employment, or another location of the user), among other examples. In some implementations, the user information may be associated with an item (e.g., for the user of the user device). For example, the user information may be information that is to be provided (e.g., to the provisioning system) to allow the user to obtain the item. In a specific example, the item may be a product (e.g., a financial product, such as a loan product, or another type of product) and the user information may include prequalification information (e.g., that is to be provided to allow the user to obtain the product).

In some implementations, the user device may send the user information to the provisioning system, such as via a communication link between the user device and the provisioning system. Accordingly, the provisioning system may obtain the user information from the user device (e.g., receive the user information via the communication link).

In some implementations, as shown by reference numbers 104 and 106, the provisioning system may obtain entity information. The entity information may indicate one or more entities (e.g., a list of one or more entities). As a specific example, as shown in FIG. 1A, the entity information may indicate a list of entities 1 through N. In some implementations, the entity information may indicate one or more entities that are associated with the user information. For example, the entity information may indicate one or more entities (e.g., one or more providers, vendors, sellers, lenders, or other types of entities) that are able to provide the item that is associated with the user information (e.g., that are able to provide the item to the user of the user device).

In some implementations, the provisioning system may communicate with the entity system to obtain the entity information. For example, as shown by reference number 104, the provisioning system may send a request for the entity information to the entity system, such as via a communication link between the entity system and the provisioning system. The request may include one or more portions of the user information. Accordingly, the entity system may search, based on the request (e.g., based on the one or more portions of the user information included in the request), a data structure (e.g., that is included in and/or is accessible to the entity system) to identify one or more entities of a plurality of entities (e.g., one or more entities that are able to provide the item that is associated with the user information). The entity system may generate the entity information to indicate the one or more entities, and, as shown by reference number 106, may send the entity information to the provisioning system (e.g., via the communication link between the entity system and the provisioning system). Accordingly, the provisioning system may obtain the entity information from the entity system (e.g., receive the entity information via the communication link).

Figure 1B:
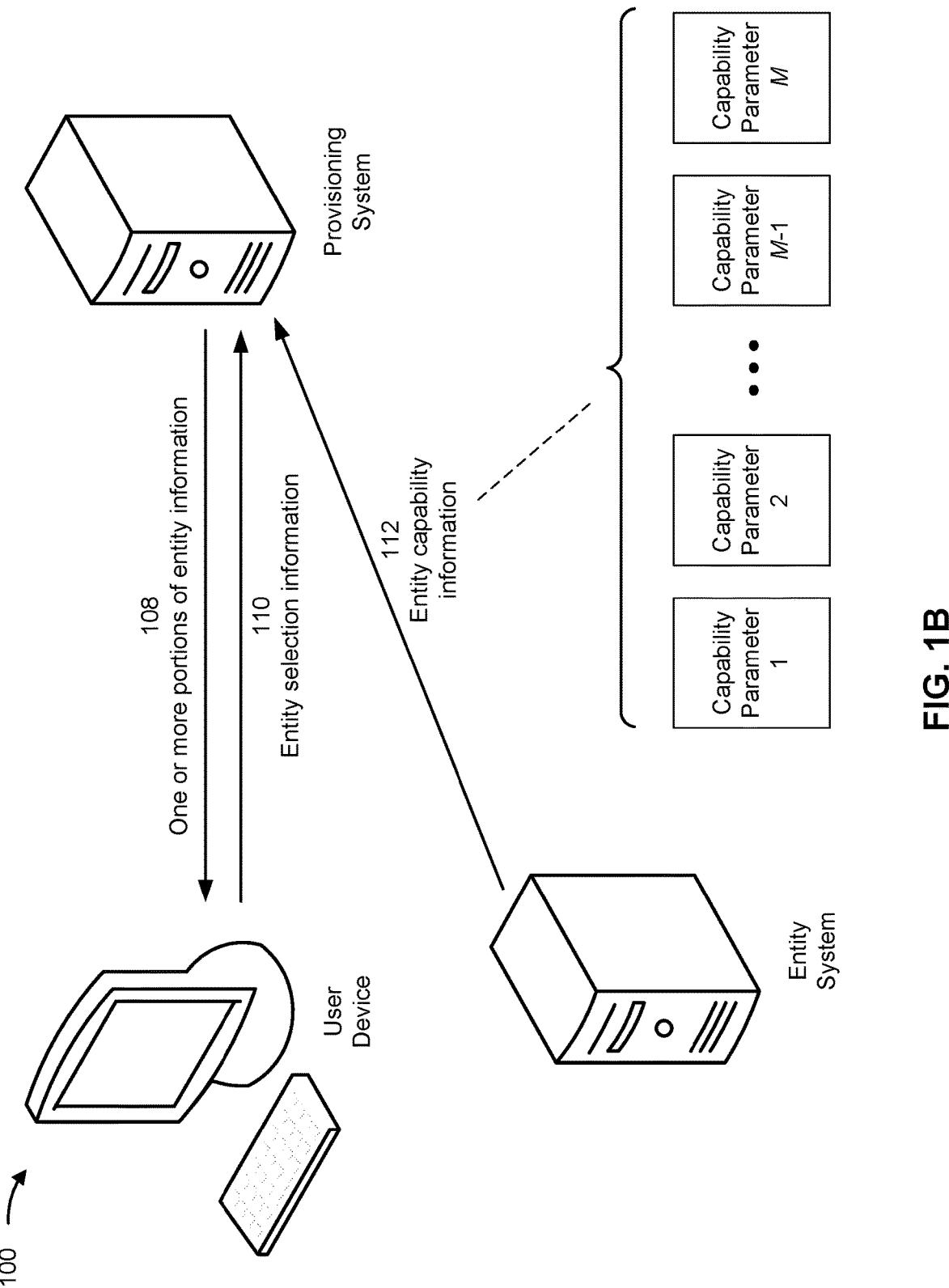

As shown in FIG. 1B, and by reference number 108, the provisioning system may send one or more portions of the entity information, such as to another device or to another system. The one or more portions of the entity information may indicate, for example, a set of one or more entities of the one or more entities. In some implementations, the provisioning system may send the one or more portions of the entity information to the user device via the communication link between the provisioning system and the user device. Accordingly, the user device may obtain the one or more portions of the entity information from the provisioning system (e.g., receive the one or more portions of the entity information via the communication link).

As shown by reference number 110, the provisioning system may obtain entity selection information (e.g., based on sending the one or more portions of the entity information), such as from another device or from another system. The entity selection information may indicate, for example, a particular entity of the one or more entities (e.g., that are indicated by the entity information). The particular entity, for example, may be an entity that is able to provide the item (e.g., that is associated with the user information), such as to the user of the user device.

In some implementations, the user device may cause the one or more portions of the entity information to be presented to the user of the user device, such as via a GUI of the user device. For example, the user device may cause the one or more portions of the entity information to be rendered in a web browser of the user device. The user of the user device therefore may select, by interacting with an input component of the user device (e.g., a mouse, a keyboard, a touchscreen), a particular entity of the one or more entities that is shown via the web browser of the user device. The user device may therefore generate the entity selection information to indicate the particular entity, and may send the entity selection information to the provisioning system (e.g., via communication link between the user device and the provisioning system). Accordingly, the provisioning system may obtain the entity selection information from the user device (e.g., receive the entity selection information via the communication link).

As shown by reference number 112, the provisioning system may obtain entity capability information (e.g., based on the entity selection information), such as from another device or from another system. The entity capability information may indicate one or more capabilities associated with the particular entity (e.g., the particular entity that is indicated by the entity selection information). As a specific example, as shown in FIG. 1B, the entity capability information may indicate capability parameters 1 through M. In some implementations, the entity capability information may indicate one or more item capability parameters associated with the particular entity, such as one or more item capability parameters that indicate different types, models, versions, features, and/or other characteristics of the item that may be provided by the particular entity. Additionally, or alternatively, the entity capability information may indicate one or more technical capability parameters associated with the particular entity, such as a processing characteristic, a communication characteristic, and/or another characteristic associated with an ability of the particular entity to provide item information (e.g., described herein in association with FIG. 1D) associated with the item (e.g., in real-time, or near real-time).

In some implementations, the provisioning system may communicate with the entity system to obtain the entity capability information. For example, the provisioning system may send a request for the entity capability information to the entity system (e.g., via the communication link between the entity system and the provisioning system), and the entity system, in response, may send the entity capability information to the provisioning system (e.g., via the communication link between the entity system and the provisioning system). In some implementations, the request for the entity capability information may include the entity selection information (e.g., the request may identify the particular entity). Accordingly, the entity system may search, based on the entity selection information included in the request, a data structure (e.g., that is the same as, or is different than, the data structure described above) to identify the one or more capabilities associated with the particular entity. The entity system may generate the entity capability information to indicate the one or more capabilities, and may send the entity capability information to the provisioning system.

Figure 1C:
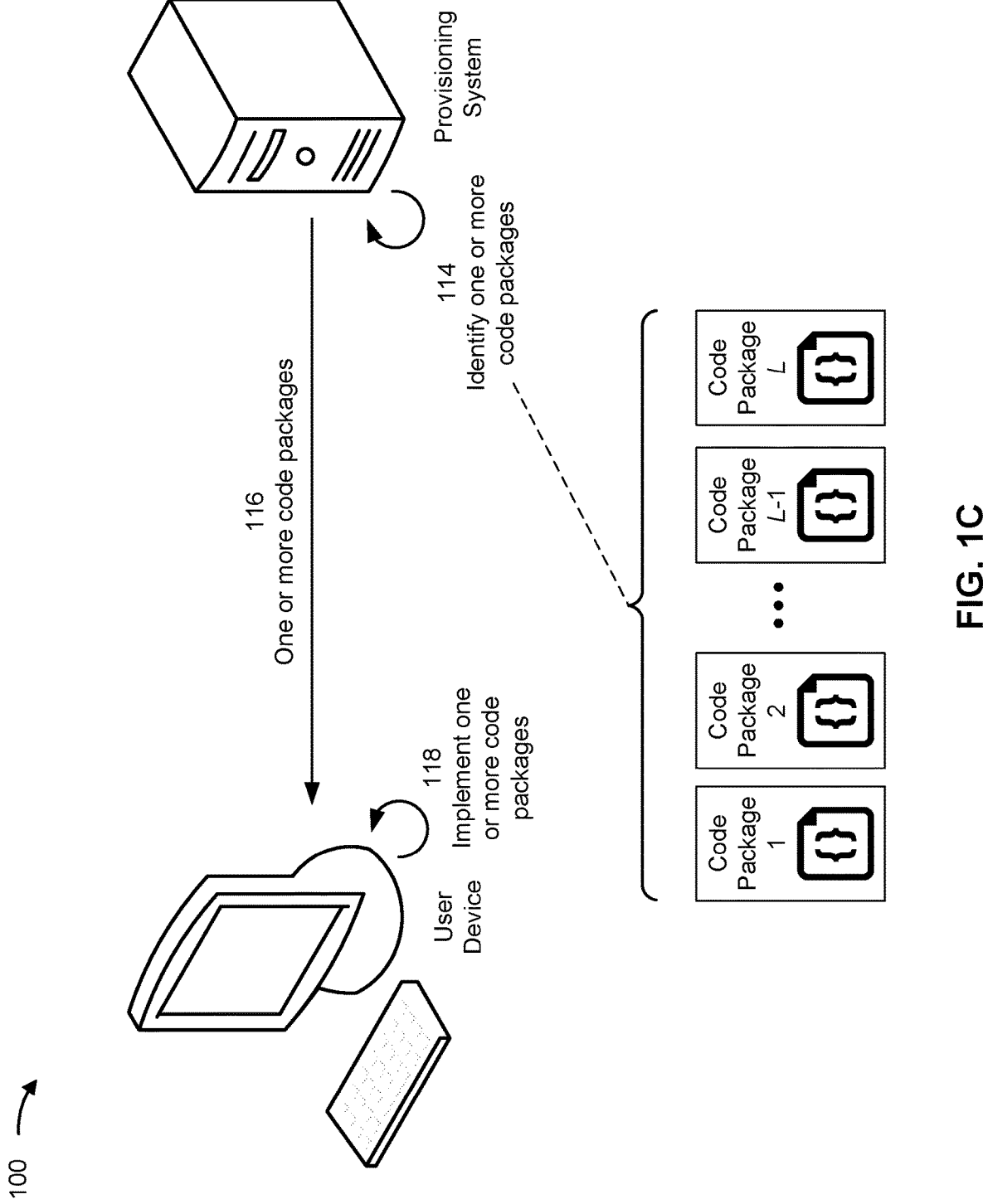

As shown in FIG. 1C and by reference number 114, the provisioning system may identify one or more code packages (e.g., based on the entity capability information). As a specific example, as shown in FIG. 1C, the provisioning system may identify code packages from 1 to L. Each code package, of the one or more code packages, may be configured to present information via a GUI of a device, such as a GUI of the user device. That is, each code package may be configured to be implemented by a device, such as the user device, to cause particular information to be displayed via a GUI of the device. For example, a code package may be a web component, which may be configured to be implemented by the device, such as in a web browser of the device.

In some implementations, the provisioning system may identify the one or more code packages from a plurality of code packages stored in a data structure (e.g., that is included in and/or is accessible to the provisioning system). For example, the provisioning system may process (e.g., parse and/or read) the entity capability information to identify a capability parameter (of the one or more capability parameters) associated with the particular entity (the particular entity that is indicated by the entity selection information). The provisioning system then may search, based on the capability parameter, the data structure to identify a code package of the plurality of code packages (e.g., identify an entry that includes the code package). That is, the capability parameter may correspond to a code package, of the plurality of code packages, and the provisioning system may search the data structure based on the capability parameter to identify the code package. The provisioning system may therefore, in a similar manner, identify the one or more code packages based on the one or more capability parameters associated with the particular entity.

As shown by reference number 116, the provisioning system may send the one or more code packages, such as to another device or another system. In some implementations, the provisioning system may send the one or more code packages to the user device via the communication link between the provisioning system and the user device. Accordingly, the user device may obtain the one or more code packages from the provisioning system (e.g., receive the one or more code packages via the communication link). This may allow the user device to control a GUI of the user device, as further described herein.

As shown by reference number 118, the user device may implement the one or more code packages. For example, the user device may implement (e.g., run or execute) a code package, of the one or more code packages, to cause particular information (e.g., that is associated with the code package) to be displayed via a GUI of the user device. As a specific example, when the code package is a web component, the user device may implement the code package in a web browser of the user device. This may cause particular information associated with the code package to be displayed via the web browser of the user device (e.g., as a web page, as an overlay on a webpage, or as a discrete portion of a webpage). In this way, by implementing the one or more code packages, the user device controls the GUI of the user device.

Figure 1D:
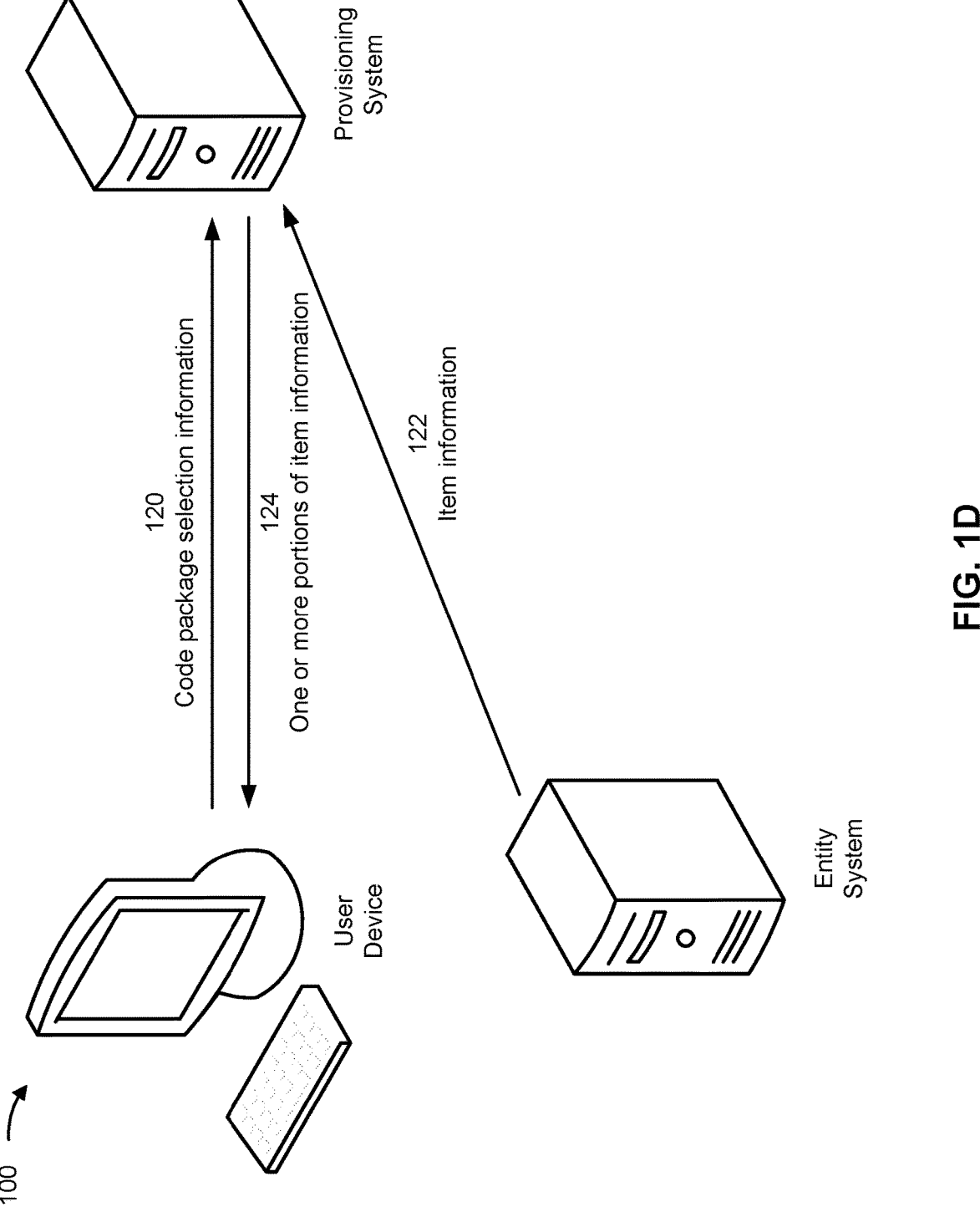

As shown in FIG. 1D, and by reference number 120, the provisioning system may obtain code package selection information (e.g., based on sending the one or more code packages), such as from another device or from another system. The code package selection information may indicate, for example, a selection associated with a particular code package of the one or more code packages (e.g., a selection associated with presentation of information associated with the particular code package via a GUI). For example, when information associated with the particular code package is displayed via the GUI of the user device (e.g., via the web browser of the user device), the user of the user device may select, by interacting with the user interface of the user device, one or more portions of the information. The user device therefore may generate the code package selection information to indicate a selection associated with the particular code package, and may send code package selection information to the provisioning system (e.g., via communication link between the user device and the provisioning system). Accordingly, the provisioning system may obtain the code package selection information from the user device (e.g., receive the code package selection information via the communication link).

As shown by reference number 122, the provisioning system may obtain item information (e.g., based on the code package selection information), such as from another device or from another system. The item information may indicate one or more details associated with an item provided by an entity, of the one or more entities, that is associated with the selection associated with the particular code package indicated by the code package selection information. For example, the item information may indicate one or more characteristics, features, dimensions, terms, conditions, and/or other details associated with the item.

In some implementations, the provisioning system may communicate with the entity system to obtain the item information. For example, the provisioning system may send a request for the item information to the entity system (e.g., via the communication link between the entity system and the provisioning system), and the entity system, in response, may send the item information to the provisioning system (e.g., via the communication link between the entity system and the provisioning system). In some implementations, the request for the item information may include the code package selection information (e.g., the request may identify the selection associated with the particular code package indicated by the code package selection information). Accordingly, the entity system may search, based on the selection included in the request, a data structure (e.g., that is the same as, or is different than, the data structures described above) to identify the one or more details associated with the item provided by the entity that is associated with the selection. The entity system may generate the item information to indicate the one or more details associated with the item, and may send the item information to the provisioning system.

As shown by reference number 124, the provisioning system may send one or more portions of the item information, such as to another device or to another system. The one or more portions of the item information may indicate, for example, a set of one or more details associated with the item of the one or more details associated with the item. In some implementations, the provisioning system may send the one or more portions of the item information to the user device via the communication link between the provisioning system and the user device. Accordingly, the user device may obtain the one or more portions of the item information from the provisioning system (e.g., receive the one or more portions of the entity information via the communication link).

In some implementations, the user device may cause the one or more portions of the item information to be presented to the user of the user device, such as via the GUI of the user device. For example, the user device may cause the one or more portions of the item information to be rendered in the web browser of the user device.

As indicated above, FIGS. 1A-1D are provided as an example. Other examples may differ from what is described with regard to FIGS. 1A-1D.

Figure 2:
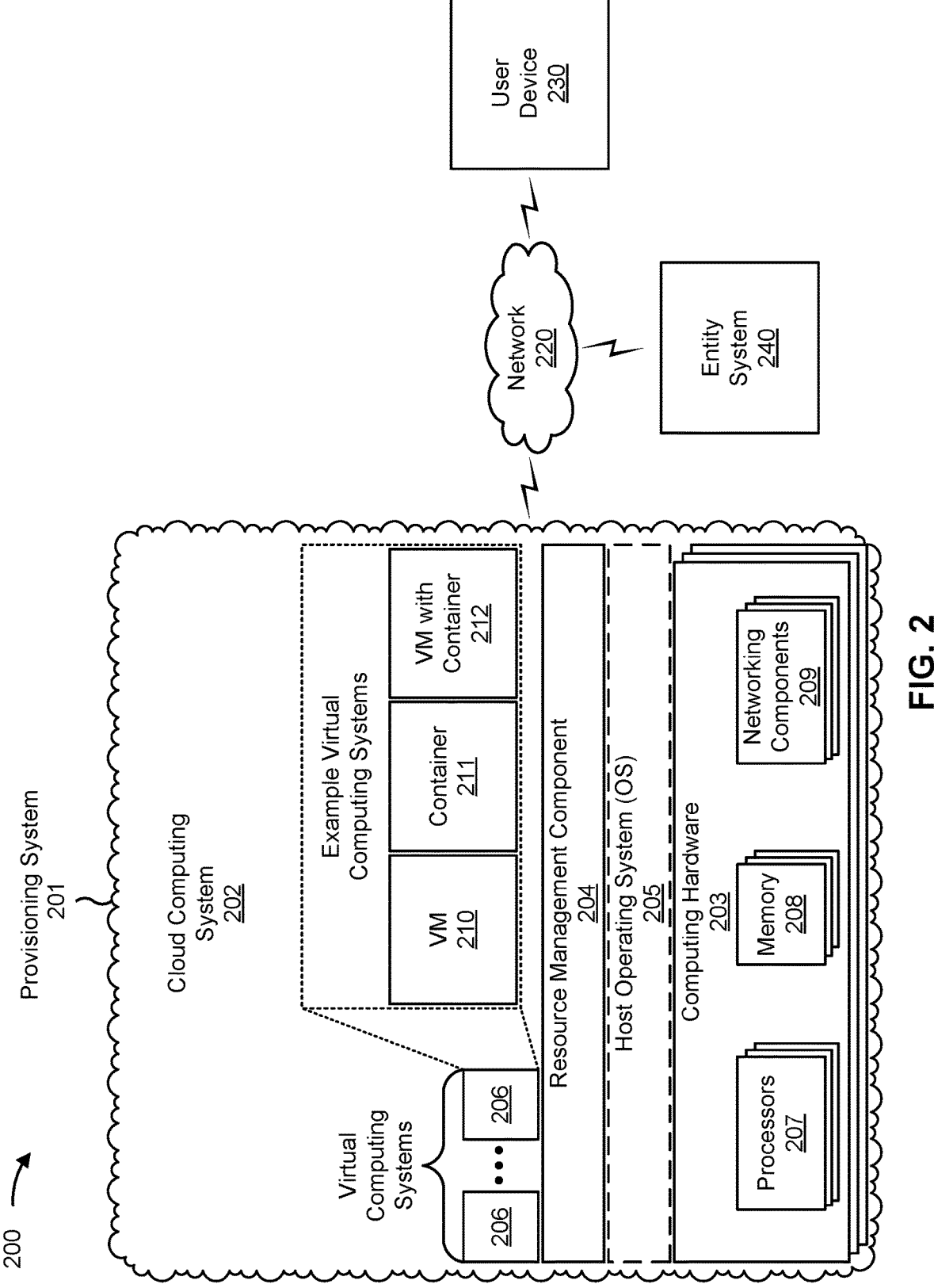
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a provisioning system 201, which may include one or more elements of and/or may execute within a cloud computing system 202. The cloud computing system 202 may include one or more elements 203-212, as described in more detail below. As further shown in FIG. 2, environment 200 may include a network 220, a user device 230, and/or an entity system 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the provisioning system 201 may include one or more elements 203-212 of the cloud computing system 202, may execute within the cloud computing system 202, and/or may be hosted within the cloud computing system 202, in some implementations, the provisioning system 201 may not be cloud-based (e.g., may be implemented outside of a cloud computing system) or may be partially cloud-based. For example, the provisioning system 201 may include one or more devices that are not part of the cloud computing system 202, such as device 300 of FIG. 3, which may include a standalone server or another type of computing device. The provisioning system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, and/or providing information associated with providing code packages, as described elsewhere herein. The user device 230 may include a communication device and/or a computing device. For example, the user device 230 may include a wireless communication device, a mobile phone, a user equipment, a laptop computer, a tablet computer, a desktop computer, or a similar type of device. As another example, the user device 230 may include a server, such as an application server, a client server, a web server, a database server, a host server, a proxy server, a virtual server (e.g., executing on computing hardware), or a server in a cloud computing system. In some implementations, the user device 230 may include computing hardware used in a cloud computing system.

The entity system 240 may include one or more devices capable of receiving, generating, storing, processing, and/or providing information associated with providing code packages, as described elsewhere herein. The entity system 240 may include a communication device and/or a computing device. For example, the entity system 240 may include a server, such as an application server, a client server, a web server, a database server, a host server, a proxy server, a virtual server (e.g., executing on computing hardware), or a server in a cloud computing system. In some implementations, the entity system 240 may include computing hardware used in a cloud computing environment, such as in a similar manner as that described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
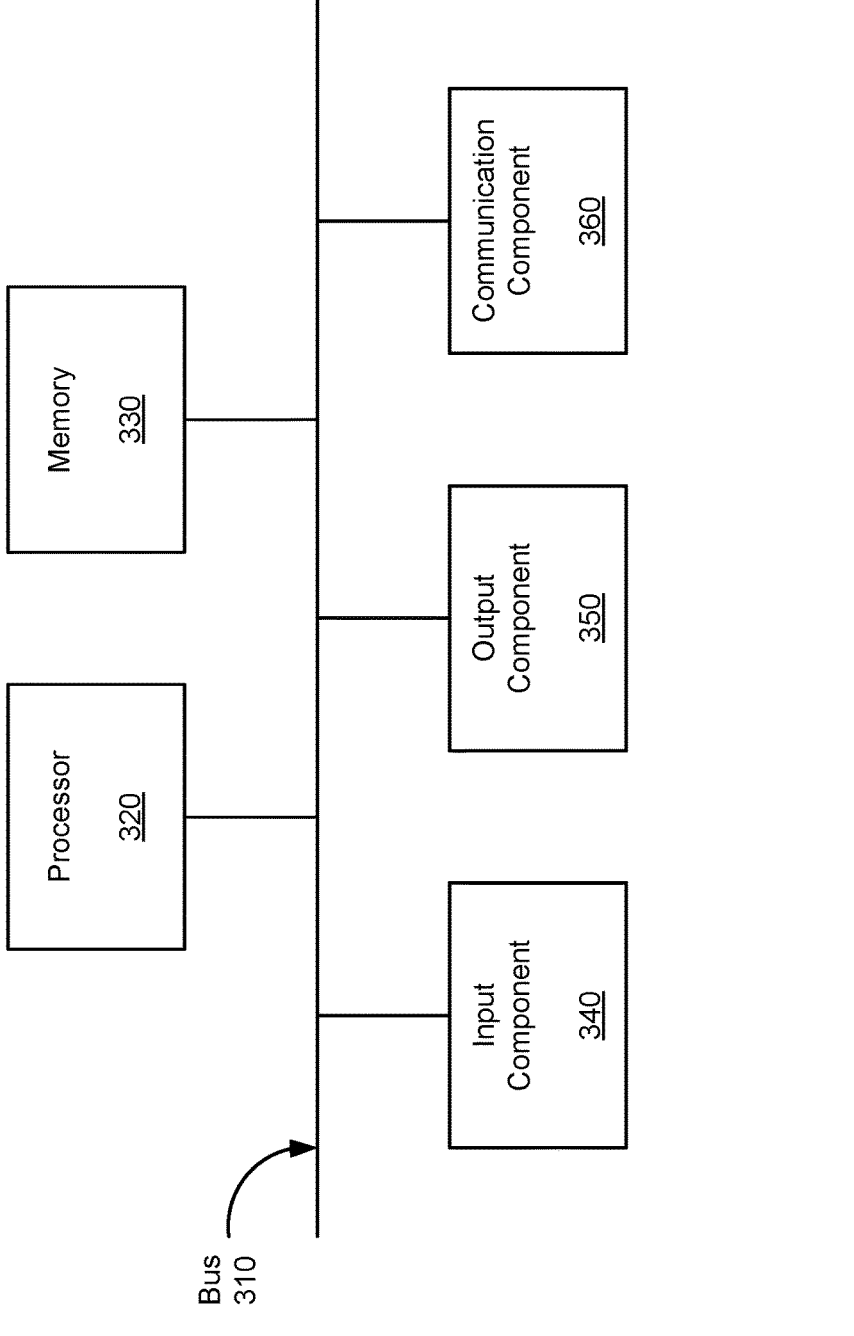
FIG. 3 is a diagram of example components of a device associated with providing code packages, in accordance with some embodiments of the present disclosure.

FIG. 3 is a diagram of example components of a device 300 associated with providing code packages. The device 300 may correspond to the provisioning system 201, the computing hardware 203, the user device 230, and/or the entity system 240. In some implementations, the provisioning system 201, the computing hardware 203, the user device 230, and/or the entity system 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300.

In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
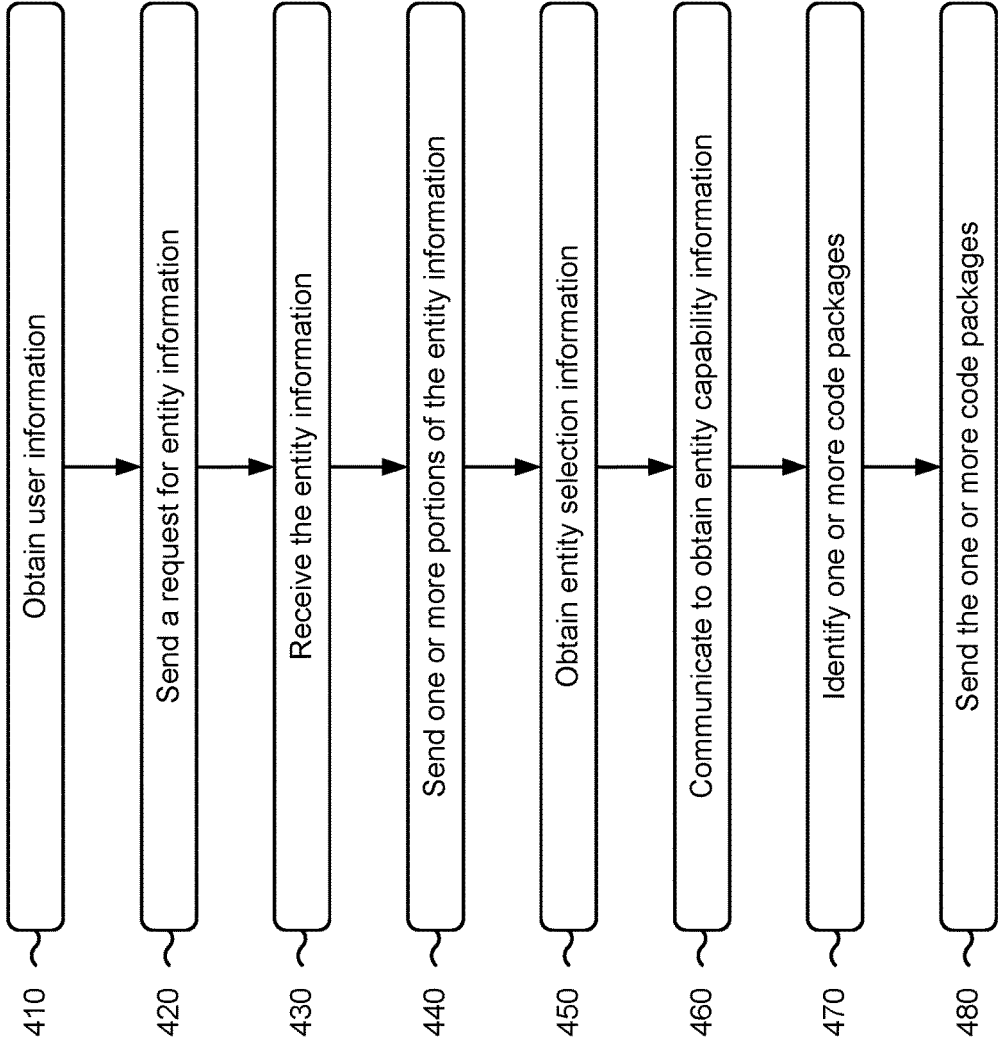
FIG. 4 is a flowchart of an example process associated with providing code packages, in accordance with some embodiments of the present disclosure.

FIG. 4 is a flowchart of an example process 400 associated with providing code packages. In some implementations, one or more process blocks of FIG. 4 may be performed by the provisioning system 201. In some implementations, one or more process blocks of FIG. 4 may be performed by another device or a group of devices separate from or including the provisioning system 201, such as the user device 230 and/or the entity system 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining user information (block 410). For example, the provisioning system 201 (e.g., using processor 320 and/or memory 330) may obtain, from a user device, user information, as described above in connection with reference number 102 of FIG. 1A. As an example, the provisioning system 201 may obtain user information (e.g., that is associated with a user of the user device 230) from the user device 230.

As further shown in FIG. 4, process 400 may include sending a request for entity information (block 420). For example, the provisioning system 201 (e.g., using processor 320, memory 330, and/or communication component 360) may send a request for entity information, as described above in connection with reference number 104 of FIG. 1A. As an example, the provisioning system 201 may send a request for entity information (e.g., that is associated with the user information) to the entity system 240.

As further shown in FIG. 4, process 400 may include obtaining the entity information (block 430). For example, the provisioning system 201 (e.g., using processor 320, memory 330, input component 340, and/or communication component 360) may obtain the entity information, as described above in connection with reference number 106 of FIG. 1A. As an example, the provisioning system 201 may obtain the entity information from the entity system 240 (e.g., based on sending the request for entity information as described in relation to block 420).

As further shown in FIG. 4, process 400 may include sending one or more portions of the entity information (block 440). For example, the provisioning system 201 (e.g., using processor 320, memory 330, and/or communication component 360) may send one or more portions of the entity information, as described above in connection with reference number 108 of FIG. 1B. As an example, the provisioning system 201 send one or more portions of the entity information to the user device 230.

As further shown in FIG. 4, process 400 may include obtaining entity selection information (block 450). For example, the provisioning system 201 (e.g., using processor 320 and/or memory 330) may obtain entity selection information, as described above in connection with reference number 110 of FIG. 1B. As an example, the provisioning system 201 may obtain entity selection information from the user device 230 (e.g., based on sending the one or more portions of the entity information as described in relation to block 440).

As further shown in FIG. 4, process 400 may include obtaining entity capability information (block 460). For example, the provisioning system 201 (e.g., using processor 320 and/or memory 330) may obtain entity capability information, as described above in connection with reference number 112 of FIG. 1B. As an example, the provisioning system 201 may communicate with the entity system 240 (e.g., based on the entity selection information) to obtain entity capability information.

As further shown in FIG. 4, process 400 may include identifying one or more code packages (block 470). For example, the provisioning system 201 (e.g., using processor 320 and/or memory 330) may identify one or more code packages, as described above in connection with reference number 114 of FIG. 1C. As an example, the provisioning system 201 may identify (e.g., based on the entity capability information) one or more code packages from a plurality of code packages stored in a data structure.

As further shown in FIG. 4, process 400 may include sending the one or more code packages (block 480). For example, the provisioning system 201 (e.g., using processor 320, memory 330, and/or communication component 360) may send the one or more code packages, as described above in connection with reference number 116 of FIG. 1C. As an example, the provisioning system 201 may send the one or more code packages to the user device 230 to allow the user device 230 to control a GUI of the user device (e.g., as described above in connection with reference number 118 of FIG. 1C).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing code packages to user devices, the system comprising:
    one or more memories; and
    one or more processors, communicatively coupled to the one or more memories, configured to:
        obtain, from a user device, user information associated with a user of the user device;
        send, to another system, a request for entity information associated with the user information;
        obtain, from the other system and based on sending the request, the entity information;
        send, to the user device, one or more portions of the entity information;
        obtain, from the user device and based on sending the one or more portions of the entity information, entity selection information;
        communicate, with the other system and based on the entity selection information, to obtain entity capability information;
        identify, based on the entity capability information, one or more code packages from a plurality of code packages stored in a data structure, wherein identifying the one or more code packages comprises:
            determining, based on the entity capability information, a capability parameter associated with an entity; and
            determining whether the one or more code packages match the capability parameter,
                wherein the one or more code packages that match to the capability are identified; and

send, to the user device, the identified one or more code packages to allow the user device to control a graphical user interface (GUI) of the user device.

2. The system of claim 1, wherein each code package, of the one or more code packages, is a web component that is configured to be implemented by the user device.

3. The system of claim 1, wherein the entity information indicates a list of one or more entities associated with the user information, and
    wherein the entity selection information indicates a particular entity of the list of one or more entities.

4. The system of claim 1, wherein the user information is associated with an item for the user of the user device, and
    wherein the entity capability information indicates one or more item capability parameters associated with an entity that is able to provide the item to the user of the user device.

5. The system of claim 1, wherein the entity capability information indicates one or more technical capability parameters associated with an entity that is indicated by the entity selection information.

6. The system of claim 1, wherein the user information is associated with an item for the user of the user device, and
    wherein the one or more processors are further configured to:
        obtain, from the user device and based on sending the one or more code packages, code package selection information;
        communicate, with the other system and based on the code package selection information, to obtain item information; and
        send, to the user device, one or more portions of the item information.

7. A non-transitory computer-readable medium storing a set of instructions, the set of instructions comprising:
    one or more instructions that, when executed by one or more processors of a system for providing code packages to user devices, cause the system to:
        obtain, from another system, entity information;
        send, to a user device, one or more portions of the entity information;
        obtain, from the user device and based on sending the one or more portions of the entity information, entity selection information;
        communicate, with the other system and based on the entity selection information, to obtain entity capability information;
        identify, based on the entity capability information, one or more code packages from a plurality of code packages stored in a data structure, wherein identifying the one or more code packages comprises:
            determining, based on the entity capability information, a capability parameter associated with an entity; and
            determining whether the one or more code packages match the capability parameter,
                wherein the one or more code packages that match to the capability are identified; and
        send, to the user device and based on the entity capability information, the identified one or more code packages to allow the user device to control a graphical user interface (GUI) of the user device.

8. The non-transitory computer-readable medium of claim 7,
    wherein each code package, of the one or more code packages, is a web component.

9. The non-transitory computer-readable medium of claim 7, wherein each code package, of the one or more code packages, is configured to present information via the GUI of the user device.

10. The non-transitory computer-readable medium of claim 7, wherein the entity information indicates one or more entities, and wherein the entity selection information indicates a particular entity of the one or more entities.

11. The non-transitory computer-readable medium of claim 7, wherein the entity capability information indicates at least one of:

one or more item capability parameters associated with an entity that is indicated by the entity selection information; or one or more technical capability parameters associated with the entity.

12. The non-transitory computer-readable medium of claim 7, wherein the one or more instructions further cause the system to:

send, to the other system, before receiving the entity information, and based on user information associated with a user of the user device, a request for the entity information.

13. The non-transitory computer-readable medium of claim 7, wherein the one or more instructions further cause the system to:

obtain, from the user device and based on sending the one or more code packages, code package selection information;

communicate, with the other system and based on the code package selection information, to obtain item information; and send, to the user device, one or more portions of the item information.

14. A method, comprising:

obtaining, by a system for providing code packages to user devices, entity selection information;

communicating, by the system, with another system, and based on the entity selection information, to obtain entity capability information;

identify, based on the entity capability information, one or more code packages from a plurality of code packages stored in a data structure, wherein identifying the one or more code packages comprises:

determining, based on the entity capability information, a capability parameter associated with an entity; and determining whether the one or more code packages match the capability parameter, wherein the one or more code packages that match to the capability are identified; and sending, by the system, to a user device, and based on the entity capability information, the identified one or more code packages to allow the user device to control a graphical user interface (GUI) of the user device.

15. The method of claim 14, wherein a code package, of the one or more code packages, is a web component.

16. The method of claim 14, wherein the entity selection information indicates a particular entity of one or more entities.

17. The method of claim 14, wherein the entity capability information indicates at least one of:

one or more item capability parameters associated with an entity that is indicated by the entity selection information; or one or more technical capability parameters associated with the entity.

18. The system of claim 1, wherein the identified one or more code packages are configured to be executed on the user device.

19. The non-transitory computer-readable medium of claim 7, wherein the identified one or more code packages are configured to be executed on the user device.

20. The method of claim 14, wherein the identified one or more code packages are configured to be executed on the user device.

\*　\*　\*　\*　\*